US011781451B2

(12) United States Patent
Perry et al.

(10) Patent No.: US 11,781,451 B2
(45) Date of Patent: Oct. 10, 2023

(54) ENGINE VARIABLE CAMSHAFT TIMING PHASER WITH PLANETARY GEAR SET

(71) Applicant: BORGWARNER, INC., Auburn Hills, MI (US)

(72) Inventors: Douglas W. Perry, Interlaken, NY (US); Chad McCloy, Cortland, NY (US)

(73) Assignee: BORGWARNER, INC., Auburn Hills, MI (US)

( * ) Notice: Subject to any disclaimer, the term of this patent is extended or adjusted under 35 U.S.C. 154(b) by 192 days.

(21) Appl. No.: 17/310,906

(22) PCT Filed: Mar. 3, 2020

(86) PCT No.: PCT/US2020/020721
§ 371 (c)(1),
(2) Date: Aug. 30, 2021

(87) PCT Pub. No.: WO2020/180829
PCT Pub. Date: Sep. 10, 2020

(65) Prior Publication Data
US 2022/0162967 A1 May 26, 2022

Related U.S. Application Data

(60) Provisional application No. 62/813,320, filed on Mar. 4, 2019.

(51) Int. Cl.
*F01L 1/352* (2006.01)
*F16H 1/28* (2006.01)
*F16H 1/32* (2006.01)

(52) U.S. Cl.
CPC ............ *F01L 1/352* (2013.01); *F16H 1/2863* (2013.01); *F16H 1/32* (2013.01); *F01L 2810/03* (2013.01); *F16H 2001/327* (2013.01)

(58) Field of Classification Search
CPC ....... F01L 1/344; F01L 1/352; F01L 2810/03; F16H 1/2863; F16H 1/32;
(Continued)

(56) References Cited

U.S. PATENT DOCUMENTS 9,664,254 B2   5/2017   McCloy
9,771,839 B2   9/2017   Wing et al.
(Continued)

FOREIGN PATENT DOCUMENTS

CN    106121759 A    11/2016
CN    107075983 A    8/2017
(Continued)

OTHER PUBLICATIONS

Chinese Office Action for Chinese Application No. 202080012192.1 dated Feb. 28, 2023 (25 pages).
(Continued)

*Primary Examiner* — Loren C Edwards
(74) *Attorney, Agent, or Firm* — REISING ETHINGTON P.C.

(57) ABSTRACT

An engine variable camshaft timing (VCT) phaser assembly is equipped in an internal combustion engine (ICE) to adjust the rotation of the engine's camshaft relative to the engine's crankshaft. The adjustments advance and retard the opening and closing movements of the engine's intake and exhaust valves. An electric motor and a planetary gear set work together amid use of the VCT phaser assembly. The planetary gear set can include two or more ring gears, planet gears, and a sun gear. A backlash condition sometimes experienced in previous VCTs is minimized in the VCT phaser assembly by one or more springs that urge the planet gears into engagement with the ring gears.

20 Claims, 6 Drawing Sheets

(58) Field of Classification Search
CPC .. F16H 2001/327; F16H 35/008; F16H 57/08; F16H 2057/127
See application file for complete search history.

(56) References Cited

U.S. PATENT DOCUMENTS

| | | |
|---|---|---|
| 9,810,109 B2 | 11/2017 | Pluta et al. |
| 10,233,999 B2 | 3/2019 | McCloy et al. |
| 10,344,825 B2 | 7/2019 | Wigsten |
| 2006/0236965 A1 | 10/2006 | Schaefer et al. |
| 2016/0348760 A1* | 12/2016 | Wigsten ............... F01L 1/352 |
| 2018/0073598 A1 | 3/2018 | Pluta et al. |
| 2019/0010837 A1 | 1/2019 | Pritchard et al. |

FOREIGN PATENT DOCUMENTS

| | | | | |
|---|---|---|---|---|
| JP | H05215191 A | * | 8/1993 | ....... F16H 2057/085 |
| JP | H05215191 A | | 8/1993 | |
| JP | 2015132289 A | | 7/2015 | |

OTHER PUBLICATIONS

English Translation of Chinese Office Action for Chinese Application No. 202080012192.1 dated Feb. 28, 2023 (12 pages).

* cited by examiner

ENGINE VARIABLE CAMSHAFT TIMING PHASER WITH PLANETARY GEAR SET

CROSS-REFERENCE TO RELATED PATENT APPLICATION

This patent application claims the benefit of priority from U.S. provisional patent application No. 62/813,320 filed on Mar. 4, 2019, the entire contents of which are incorporated herein.

TECHNICAL FIELD

The present application relates to variable valve timing (VVT) for internal combustion engines (ICEs) and, more particularly, relates to variable camshaft timing (VCT) phasers equipped on ICEs.

BACKGROUND

Variable valve timing (VVT) systems are commonly used with internal combustion engines—such as those found in automobiles—for controlling intake and exhaust valve opening and closing. The VVT systems can help improve fuel economy, reduce exhaust emissions, and enhance engine performance, among other benefits. One type of VVT system employs a variable camshaft timing (VCT) phaser. In general, VCT phasers dynamically adjust the rotation of engine camshafts relative to engine crankshafts in order to advance or retard the opening and closing movements of intake and exhaust valves. In recent years, VCT phasers have been employing the use of an electric motor and a planetary gear set that work together to accomplish its functionality. The planetary gear sets of these arrangements can sometimes include multiple ring gears.

SUMMARY

In one implementation, an engine variable camshaft timing (VCT) phaser assembly may include a planetary gear set. The planetary gear set may include two or more ring gears, multiple planet gears, and a sun gear. The planet gears are carried by multiple pins. A clearance can reside between one or more planet gears and the corresponding pins that carry each planet gear. The planet gears engage the ring gears, and the sun gear engages the planet gears. The planetary gear set may further include one or more springs. The spring(s) urges the planet gears radially outboard and displace the planet gears radially outboard via the clearance. The planet gears are urged into engagement with the ring gears.

In another implementation, an engine variable camshaft timing (VCT) phaser assembly may include a planetary gear set. The planetary gear set may include two or more ring gears, multiple planet gears, and a sun gear. The planet gears engage the ring gears, and the sun gear engages the planet gears. The planetary gear set may further include multiple pins and multiple springs. The pins carry the planet gears, and each pin has a hollow section. The springs are situated partly or more within the hollow sections. The springs exert a biasing force against an inner wall of the planet gears.

In yet another implementation, an engine variable camshaft timing (VCT) phaser assembly may include a planetary gear set. The planetary gear set may include two or more ring gears, multiple planet gears, and a sun gear. The planet gears are carried by multiple pins. A clearance resides between the planet gears and the pins. The planet gears engage the ring gears, and the sun gear engages the planet gears. The planetary gear set may further include multiple springs that are held by the pins. The springs bias the clearance to a closed state at a radially inboard side of a planet-gear-to-pin confrontation, and the springs bias the clearance to an open state at a radially outboard side of the planet-gear-to-pin confrontation.

DETAILED DESCRIPTION

The figures illustrate embodiments of an engine variable camshaft timing (VCT) phaser assembly 10 that can be equipped in an internal combustion engine (ICE) like those found in automotive applications. The VCT phaser assembly 10 controls intake and exhaust valve opening and closing in the ICE. The VCT phaser assembly 10 dynamically adjusts the rotation of the ICE's camshaft relative to the ICE's crankshaft for advancing or retarding the opening and closing movements of the intake and exhaust valves. The VCT phaser assembly 10 is of the type that employs an electric motor 12 and a planetary gear set 14 with multiple ring gears. While described below in more detail, a degree of compliance is incorporated into the design and construction of the planetary gear set 14 in order to—in concert with one or more springs—minimize a backlash condition sometimes experienced among gears of the planetary gear set 14. The spring(s) acts to bias the gears of the planetary gear set 14 into engagement with one another. Noise, vibration, and harshness (NVH) is also minimized. Further, as used herein, the terms axially, radially, and circumferentially, and their related grammatical forms, are used in reference to the generally circular shape of the shown VCT phaser assembly and some of its components. In this sense, axially refers to a direction that is generally along or parallel to a central axis of the circular shape, radially refers to a direction that is generally along or parallel to a radius of the circular shape, and circumferentially refers to a direction that is generally along or in a similar direction as a circumference of the circular shape.

Figure 1:
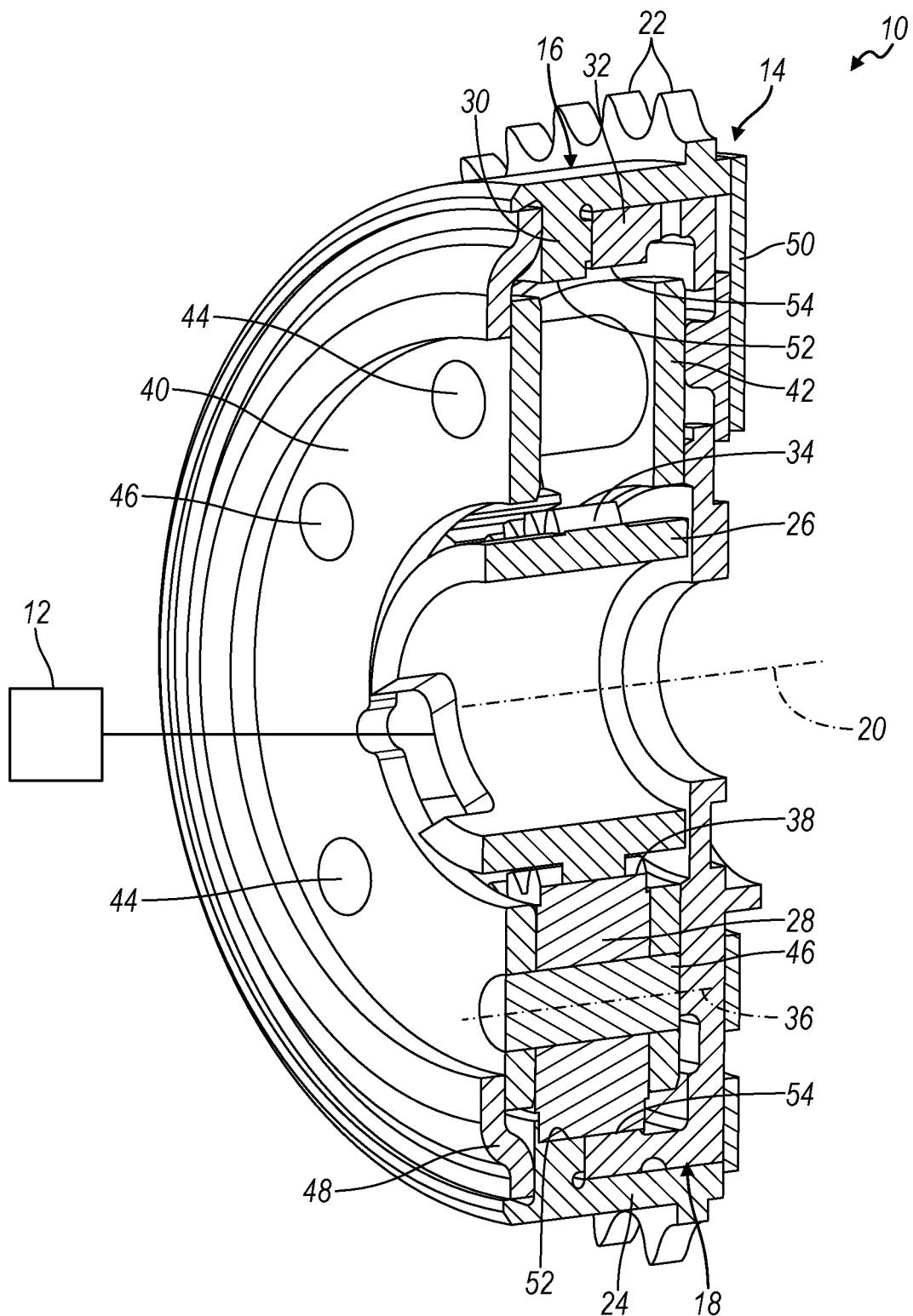
FIG. 1 is a sectional view of an embodiment of an engine variable camshaft timing (VCT) assembly.

The VCT phaser assembly 10 can have various designs and constructions in various embodiments depending upon, among other possible factors, the particular application in which the VCT phaser assembly 10 is employed and the crankshaft and camshaft that it works with. In the embodiment presented in FIG. 1, for example, the VCT phaser assembly 10 includes a sprocket 16, the planetary gear set 14, and a cam plate 18. The example of FIG. 1 is used, in general, for describing components of an example VCT phaser assembly. The spring(s) described below with reference to FIGS. 2-9 and the accompanying constructions can be incorporated into a VCT phaser assembly such as that of FIG. 1. The VCT phaser assembly can have more, less, and/or different components than those described herein. In FIG. 1, the sprocket 16 receives rotational drive input from the ICE's crankshaft and rotates about an axis 20. A timing chain or timing belt can be looped around the sprocket 16 and around the ICE's crankshaft so that rotation of the crankshaft translates into rotation of the sprocket 16. In this example, at an exterior the sprocket 16 has a set of teeth 22 for mating with the timing chain. Further, the sprocket 16 has a cylindrical wall 24.

Still referring to FIG. 1, the planetary gear set 14 includes a sun gear 26, planet gears 28, and a first ring gear 30 and a second ring gear 32. The sun gear 26 is connected to the electric motor 12 and is driven by the electric motor 12 for rotation about the axis 20. The connection between the sun gear 26 and electric motor 12 can be made via a pin and slot interconnection or some other way. The sun gear 26 engages with the planet gears 28 and has a set of teeth 34 at its exterior for making direct teeth-to-teeth meshing with the planet gears 28. The planet gears 28 rotate about their individual rotational axes 36 when in the midst of bringing the ICE's camshaft to and from its advanced and retarded angular positions. When not advancing or retarding, on the other hand, the planet gears 28 revolve together around the axis 20 with the sun gear 26 and with the ring gears 30, 32. In the embodiment presented here, there are a total of three planet gears 28 that are similarly designed and constructed, but there could be other quantities of planet gears such as two or four or six. Each planet gear 28 engages with the first and second ring gears 30, 32, and each planet gear 28 has a set of teeth 38 at its exterior for making direct teeth-to-teeth meshing with the ring gears 30, 32. A carrier assembly holds the planet gears 28 in place at the interior of the VCT phaser assembly 10 and includes an outer carrier plate 40, an inner carrier plate 42, carrier pins 44, and planet gear pins 46. The planet gear pins 46 carry the planet gears 28. Furthermore, an outer retaining plate 48 extends between the cylindrical wall 24 and the outer carrier plate 40, and an inner retaining plate 50 is situated opposite the outer retaining plate 48.

The first ring gear 30 receives rotational drive input from the sprocket 16 so that the first ring gear 30 and sprocket 16 rotate together about the axis 20 in operation. In this embodiment the first ring gear 30 is a unitary extension of the sprocket 16, but the components could be discrete and connected together in other embodiments such as by bolts, welds, interfitting cutouts and tabs, and/or some other way. The first ring gear 30 engages with the planet gears 28 and has a set of teeth 52 at its interior for making direct teeth-to-teeth meshing with the planet gears 28. The second ring gear 32 drives rotation of the cam plate 18 and the two components rotate together about the axis 20 in operation. In this embodiment the second ring gear 32 is a unitary extension of the cam plate 18, but the components could be discrete and connected together in other embodiments such as by bolts, welds, interfitting cutouts and tabs, and/or some other way. The second ring gear 32 engages with the planet gears 28 and has a set of teeth 54 at its interior for making direct teeth-to-teeth meshing with the planet gears 28. Furthermore, with respect to each other, the number of individual teeth between the first and second ring gears 30, 32 can differ such as by a multiple of the number of planet gears 28 present in the planetary gear set 14. Satisfying this relationship furnishes the advancing and retarding capabilities by imparting relative rotational movement and relative speed between the first and second ring gears 30, 32.

Together, the two ring gears 30, 32 constitute a split ring gear construction of the planetary gear set 14. Still, the planetary gear set 14 could include more than two ring gears. For example, the planetary gear set 14 could include an additional third ring gear for a total of three ring gears in the planetary gear set 14. Here, the third ring gear could also drive rotation of the cam plate 18 like the second ring gear 32, and could have the same number of individual teeth as the second ring gear 32.

Lastly, the cam plate 18 can be connected to the ICE's camshaft and drives rotation of the ICE's camshaft about the axis 20.

In some VCT phaser assemblies, it has been found that an unwanted backlash condition can be experienced among the gears of the planetary gear set. The backlash condition, it has been determined, is a consequence of the demanding teeth tolerances of the gears of the planetary gear set and the attendant manufacturing precision called for, especially at the meshing gear teeth among the planet gears and two ring gears and the differing designs and constructions of teeth of the two rings. The backlash condition, when present, can cause noise, vibration, and harshness (NVH) in the VCT phaser assembly.

To resolve these drawbacks, a degree of compliance is introduced into the design and construction of the planetary gear set 14 that, alongside a biasing force exerted by one or more springs also incorporated into the planetary gear set 14, serves to minimize the unwanted backlash condition. The biasing force urges a closer teeth-to-teeth meshing among the planet gears 28 and the first and second ring gears 30, 32, bringing the meshing teeth toward a theoretically ideal zero backlash condition. These actions have been shown to introduce damping in the planetary gear set 14 and hence minimize NVH that might otherwise occur. In the embodiments of the figures, the compliance is in the form of a clearance provided at the planet gears 28.

Figure 2:
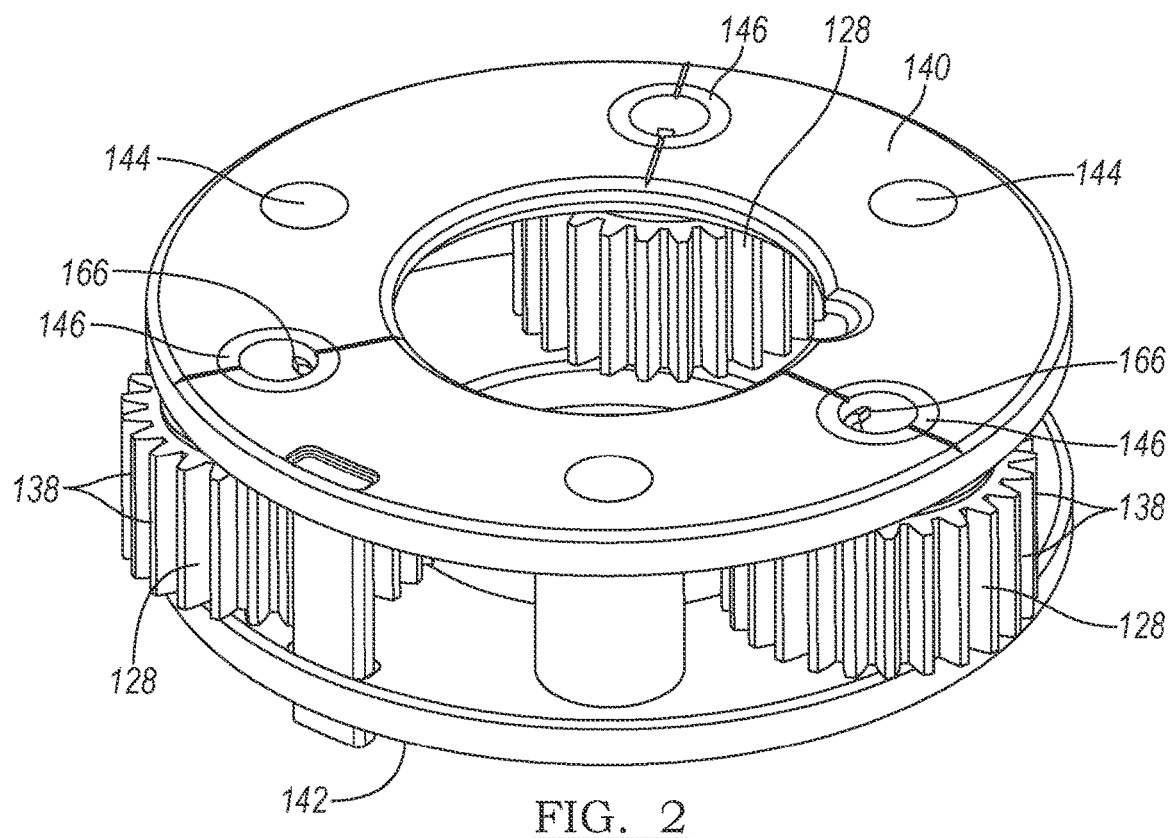
FIG. 2 is a perspective view of an embodiment of planet gears of the engine VCT assembly.
Figure 3:
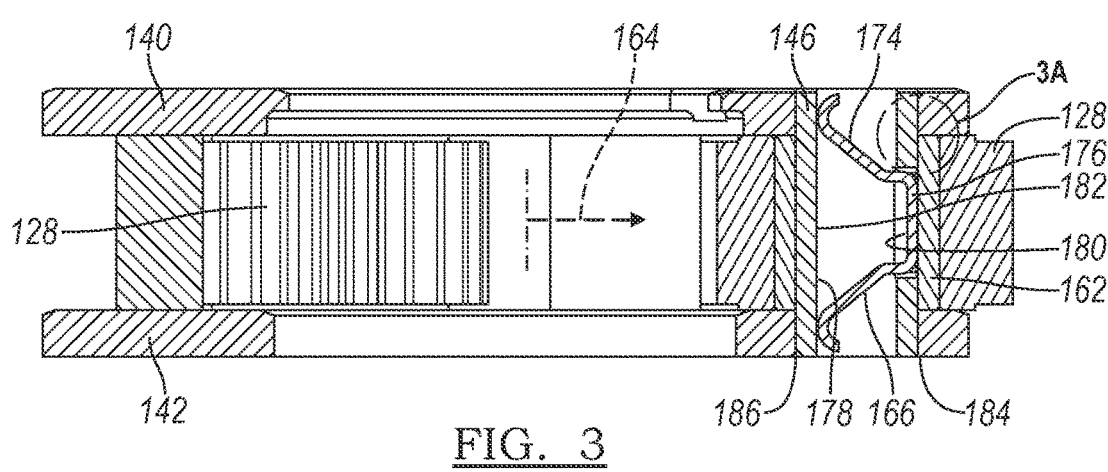
FIG. 3 is a sectional view of the planet gears, showing an embodiment of a spring.
Figure 3A:
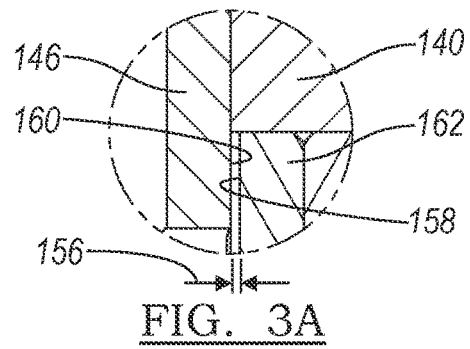
FIG. 3A is an enlarged view of a clearance at the planet gears.
Figure 4:
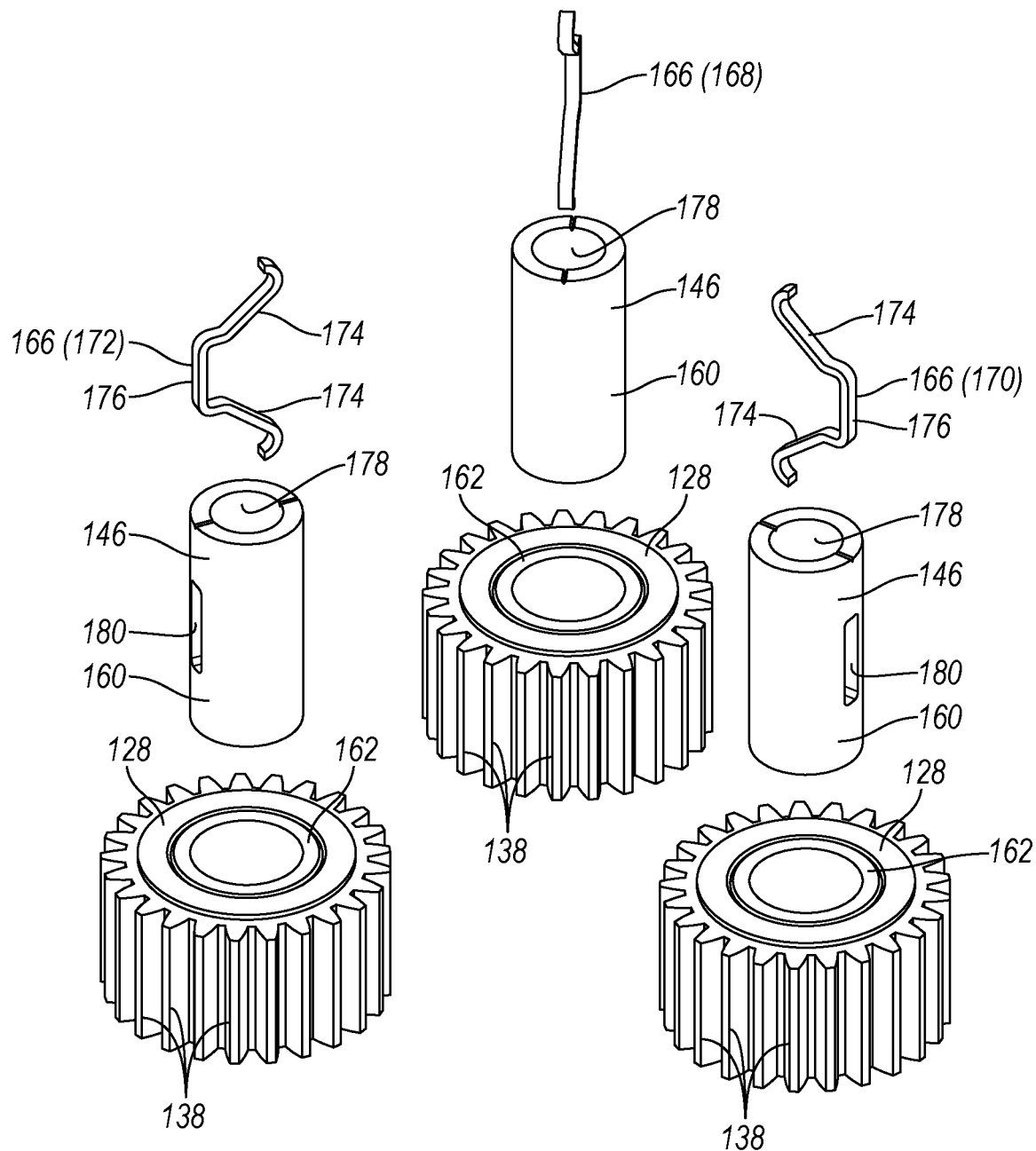
FIG. 4 is an exploded view of the planet gears and the spring.

Turning now to FIGS. 2-4, in this embodiment a clearance 156 (FIG. 3A) is incorporated into the design and construction of the planet gears 128 and planet gear pins 146. The clearance 156 is predefined and purposefully set greater than what would otherwise be for that dimension. In some implementations, the clearance 156 can be included with only one planet gear while the remaining planet gears 128 lack the purposeful clearance. The planet gear having the clearance can be biased in a radially-outboard direction into engagement with ring gears and this movement can be communicated to the remaining planet gears without the clearance through the carrier plates. Or in other implementations, more than one planet gear 128 can include the clearance 156. That is, one or more planet gears 128 can include the clearance 156 and one or more planetary gears 128 can lack the clearance 156. For example, the clearance 156 can have a dimension that ranges approximately between 0.100-0.200 millimeters (mm), while past dimensions between planet gears and planet gear pins lacking the purposeful clearance 156 could range approximately between 0.020-0.040 mm. In this way the clearance 156 establishes a gap that can close upon displacement of the planet gears 128 relative to the planet gear pins 146 due to biasing force exertions. The clearance 156 resides at a surface-to-surface confrontation between the planet gears 128 and planet gear pins 146 and, absent the biasing force, spans around the circumferential extent of confrontation between the planet gears 128 and planet gear pins 146. Further, the clearance 156 spans the axial extent of confrontation between the planet gears 128 and planet gear pins 146. The clearance 156 is defined between an inner wall and surface 158 of the planet gears 128 and an outer wall and surface 160 of the planet gear pins 146. The inner wall and surface 158 can be an inner wall and surface of a hub 162 of the planet gears 128. Furthermore, as illustrated by the closeup of FIG. 3A, the confrontation between the planet gear pins 146 and the outer and inner carrier plates 140, 142 can lack a predefined and purposeful clearance like the clearance 156.

The spring(s) exerts a biasing force and serves to urge the planet gears 128 in a radially outboard direction 164 (FIG. 3) and toward the first and second ring gears 30, 32. The planet gears 128 are moved and displaced in the radially outboard direction 164 by virtue of the clearance 156 and the accompanying latitude provided thereby. The planet gears 128 are hence urged into tighter engagement with the first and second ring gears 30, 32, and a closer teeth-to-teeth meshing thereamong results. Moreover, the spring(s) introduces a damping effect in the planetary gear set 14 that minimizes NVH. The spring(s) can have various designs and constructions in various embodiments. In the embodiment presented by FIGS. 2-4, the spring(s) is in the form of multiple leaf springs 166, one for each planet gear 128: a first leaf spring 168, a second leaf spring 170, and a third leaf spring 172. With particular reference to FIG. 4, each leaf spring 166 has a pair of leg and foot portions 174 and has a head portion 176 bridging the leg and foot portions 174.

As perhaps demonstrated best by the exploded view of FIG. 4, each leaf spring 166 is held by a single planet gear pin 146. In the embodiment here, the planet gear pins 146 have a bore or hollow section 178. The hollow sections 178 span through the planet gear pins 146 over an axial extent between open ends of the planet gear pins 146. Furthermore, each planet gear pin 146 has a window 180 residing in its wall 160 and spanning fully through the wall 160. The windows 180 can be shaped to correspond to the shape of the head portions 176. In assembly, and as shown in FIG. 3, the planet gear pins 146 are seated with the planet gears 128 such that the windows 180 are positioned at a radially-outboard location. The leaf springs 166 are situated partly or more within the hollow sections 178 of the planet gear pins 146. The head portions 176 extend through the windows 180 in assembly, with the leg and foot portions 174 abutting an opposing inner surface 182 of the planet gear pins 146 at the hollow sections 178.

Still referring to FIG. 3, by extending through the windows 180, the head portions 176 make direct surface-to-surface abutment with the inner walls and surfaces 158 of the planet gears 128. In this way, in this embodiment, the leaf springs 166 exert a biasing force directly against the inner walls and surfaces 158 of the planet gears 128. The biasing forces are directed in the radially outboard direction 164. The planet gears 128 are in turn urged and displaced in the radially outboard direction 164. The clearances 156 are compelled to open to their widest extent at a radially outboard side 184 of the confrontation between the planet gears 128 and the planet gear pins 146 due to the biasing forces of the leaf springs 166. And, contrarily, the clearances 156 are compelled to close at a radially inboard side 186 of the confrontation between the planet gears 128 and planet gear pins 146 due to the biasing forces of the leaf springs 166. The displacement of the planet gears 128 brings them into tighter engagement with the first and second ring gears 30, 32, and the sets of teeth 138, 52, 54 exhibit a closer teeth-to-teeth meshing. Accordingly, any unwanted backlash condition that might otherwise arise among the sets of teeth 138, 52, 54 is minimized. Moreover, the leaf springs 166 may give under certain loads, introducing a damping effect in the planetary gear set 14 that minimizes NVH.

In alternative embodiments similar to that of FIGS. 2-4, the spring(s) could have different forms other than a leaf spring. In one example, for instance, the spring(s) could be in the form of multiple spring-loaded ball detents held by the planet gear pins and extending therefrom to make abutment with the planet gears.

Figure 5:
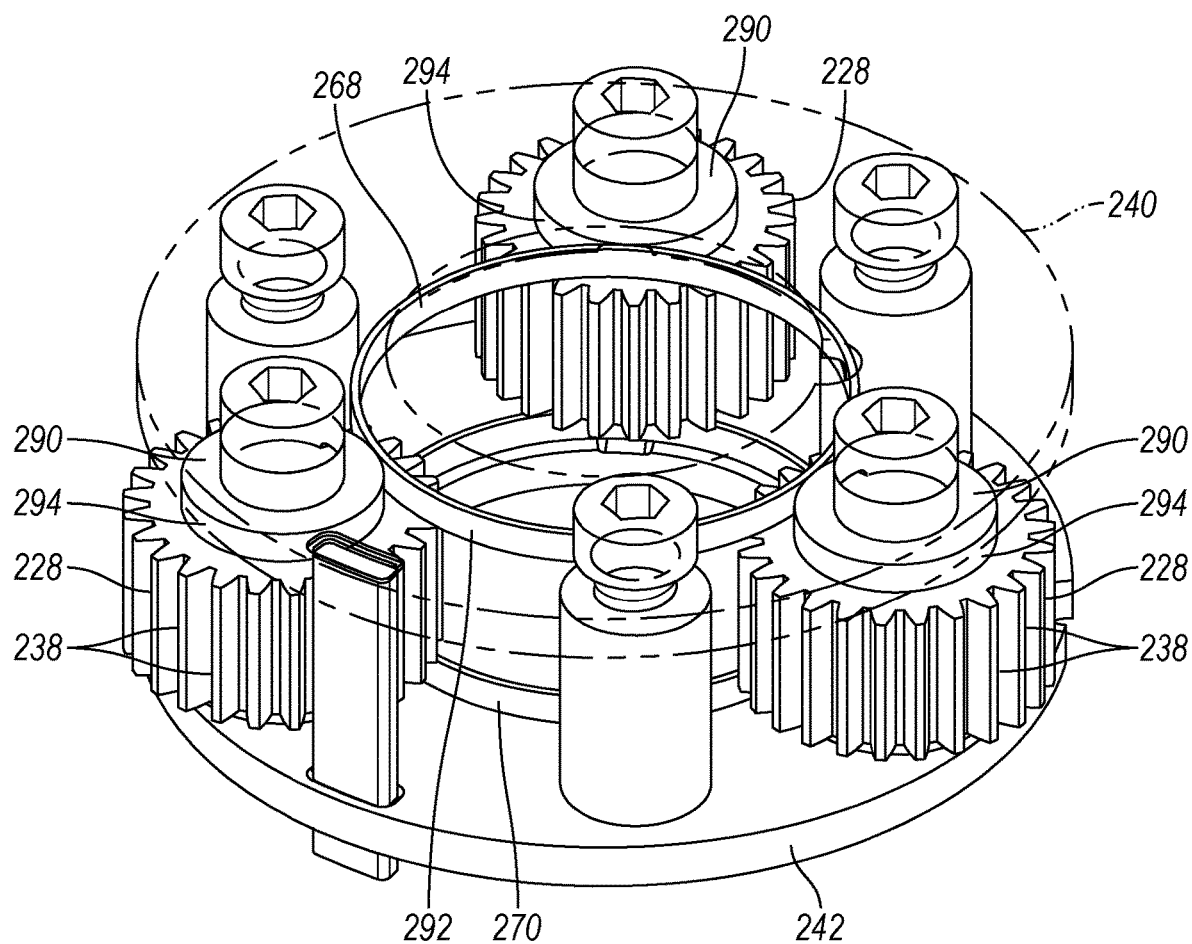
FIG. 5 is a perspective view of another embodiment of planet gears of the engine VCT assembly, showing another embodiment of a spring.
Figure 6:
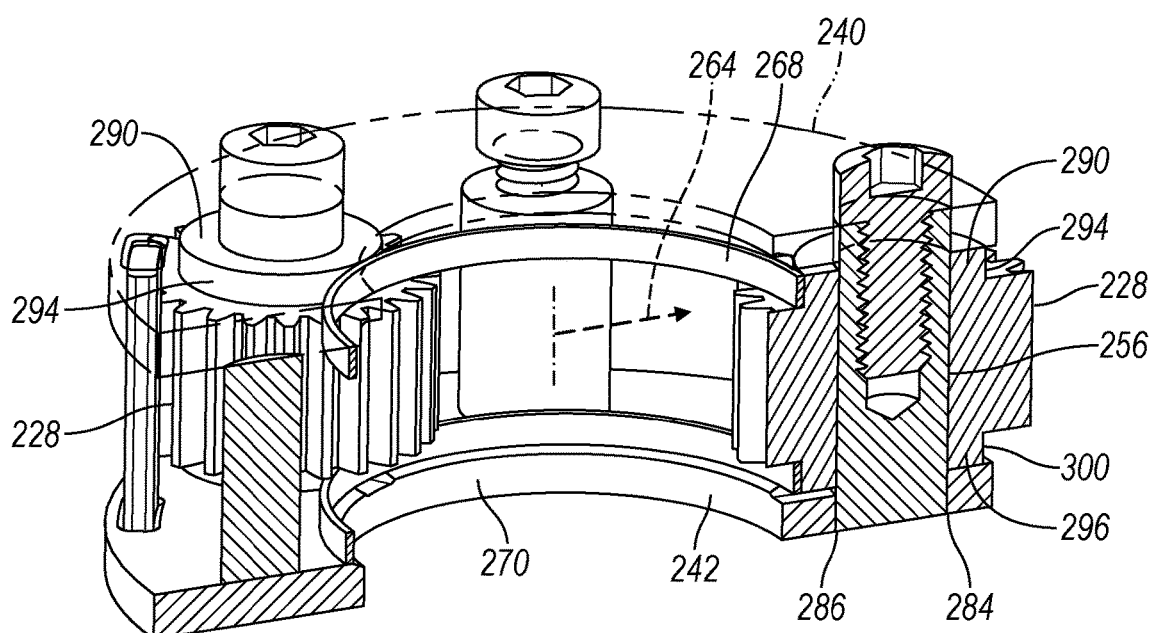
FIG. 6 is a sectional view of the planet gears and spring of FIG. 5.
Figure 7:
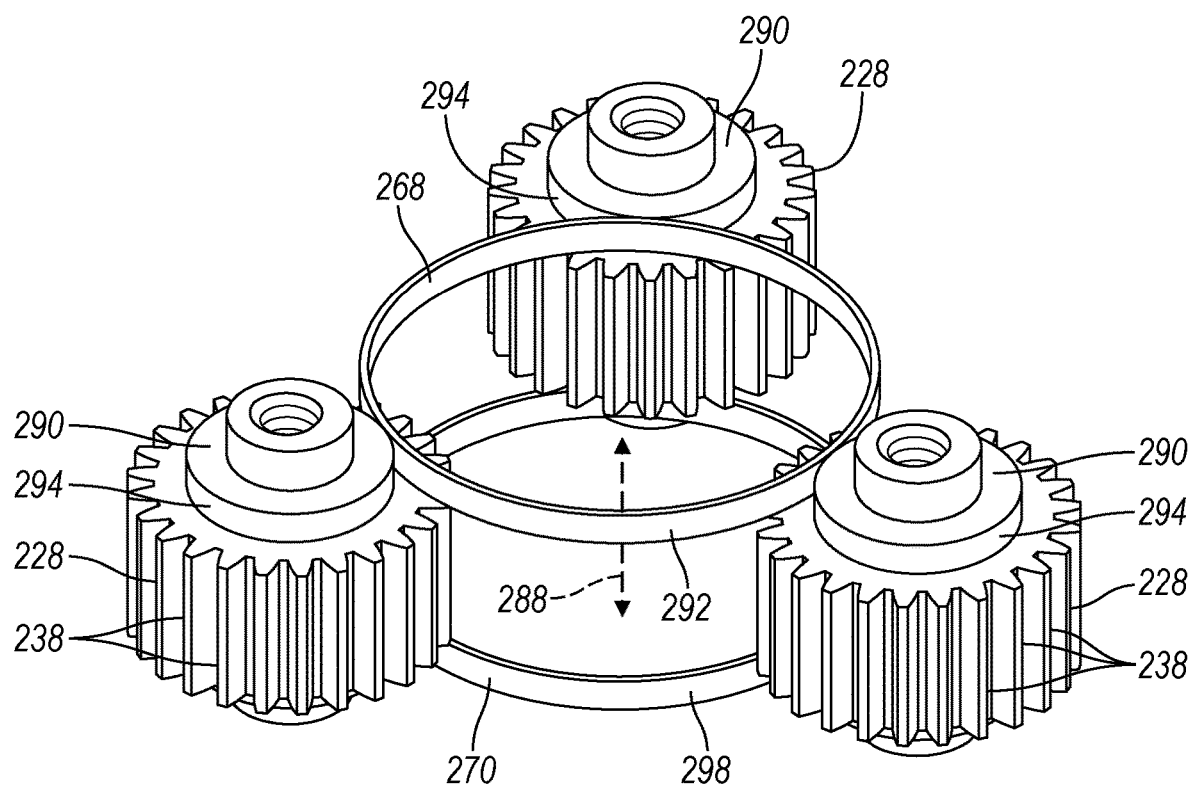
FIG. 7 is another perspective view of the planet gears and spring of FIG. 5.

Turning now to FIGS. 5-7, in another embodiment the spring(s) is in the form of a first ring spring 268 and a second ring spring 270. The first and second ring springs 268, 270 have continuous annular structures, as evident from FIG. 7. The first and second ring springs 268, 270 are generally situated radially inboard of the planet gears 228. With respect to an axis 288 (FIG. 7), in assembly the first ring spring 268 is situated at a first axially outboard side of the planet gears 228, and is situated axially inboard of the outer carrier planet 240. The outer carrier plate 240 and the planet gears 228 sandwich the first ring spring 268 in the axial direction and hold it in place. In this embodiment, the planet gears 228 have first outer walls 290, or hub portions, protruding axially outboard relative to the sets of teeth 238. The first ring spring 268 makes abutment with the first outer walls 290. More specifically, a first outer surface 292 of the first ring spring 268 makes direct surface-to-surface abutment with first outer surfaces 294 of the first outer walls 290.

Similar to the first ring spring 268, the second ring spring 270 is situated at a second axially outboard side of the planet gears 228, and is situated axially inboard of the inner carrier plate 242. The inner carrier plate 242 and the planet gears 228 sandwich the second ring spring 270 in the axial direction and hold it in place in assembly. In this embodiment, the planet gears 228 have second outer walls 296 (FIG. 6), or hub portions, protruding axial outboard relative to the sets of teeth 238. The second ring spring 270 makes abutment with the second outer walls 296. More specifically, a second outer surface 298 of the second ring spring 270 makes direct surface-to-surface abutment with second outer surfaces 300 of the second outer walls 296.

As in the previous embodiment, in this embodiment of FIGS. 5-7, the clearances 256 (FIG. 6) reside at the surface-to-surface confrontation between the planet gears 228 and planet gear pins 246. It should be appreciated that, while not as precisely depicted as the clearance 156 in FIG. 3A, the clearances 256 of this embodiment would indeed have a similar predefined and purposeful dimension and established gap as previously described. The first and second ring springs 268, 270 exert biasing forces directly against the respective first and second outer walls 290, 296 of the planet gears 228. As before, the biasing forces are directed in the radially outboard direction 264, and the planet gears 228 are in turn urged and displaced in the radially outboard direction 264. The clearances 256 are again compelled to open to their widest extent at the radially outboard side 284, and compelled to close at the radially inboard side 286. As a result, like the previous embodiment, any unwanted backlash condition is minimized and NVH is minimized.

Figure 8:
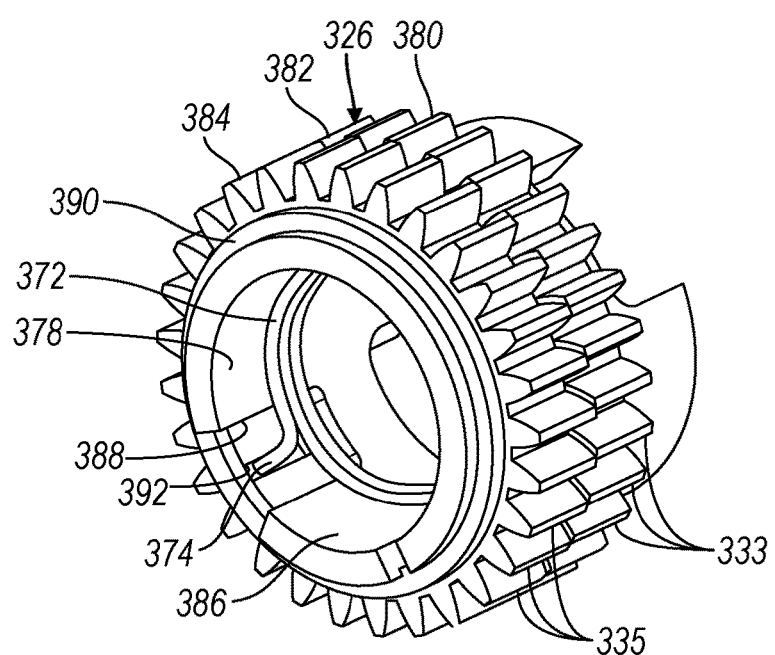
FIG. 8 is a perspective view of an embodiment of a sun gear, showing yet another embodiment of a spring.
Figure 9:
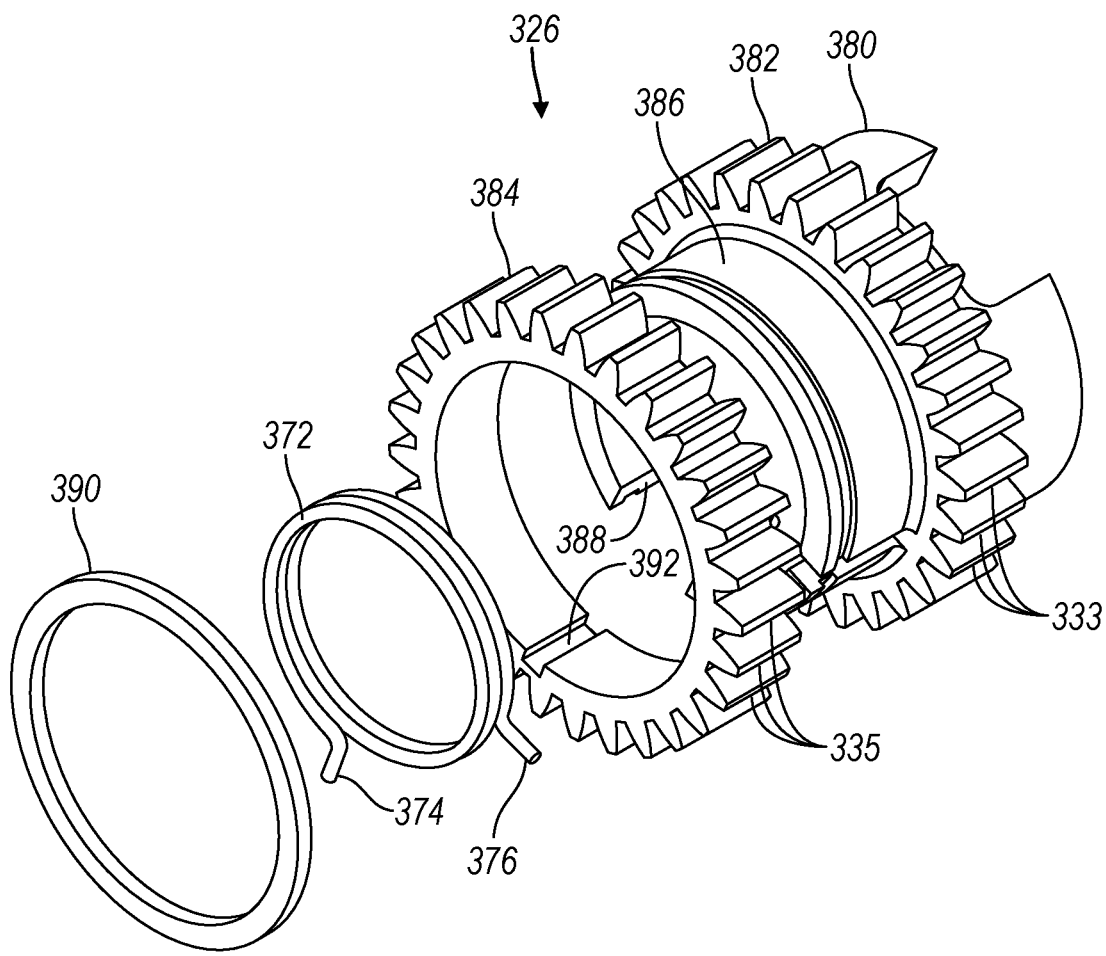
FIG. 9 is an exploded view of the sun gear and spring of FIG. 8.

Turning now to FIGS. 8 and 9, in yet another embodiment the spring(s) is in the form of a torsion spring 372. The torsion spring 372 has a first terminal end 374 and a second terminal end 376. The first and second terminal ends 374, 376 each project radially outwardly with respect to the circular shape of the torsion spring's body. In this embodiment, the torsion spring 372 is held by the sun gear 326 and is generally situated at an interior 378 of the sun gear 326. The sun gear 326 differs in design, construction, and components than the sun gear described with reference to FIG. 1. The sun gear 326 of FIGS. 8 and 9 includes a main body 380 with a first teeth segment 382, and includes a second teeth segment 384. The main body 380 has a skirt portion 386 with a first cutout 388. The first teeth segment 382 has a first set of teeth 333 for making direct teeth-to-teeth meshing with the planet gears 28. The second teeth segment 384 is inserted over the skirt portion 386 of the main body 380 and secured thereat via a snap ring 390. For pre-loading purposes, as described below, the second teeth segment 384 is rotatable at the skirt portion 386 independent of the main body 380 and independent of the first teeth segment 382. The second teeth segment 384 has a second cutout 392 at its interior, and has a second set of teeth 335 at its exterior for making direct teeth-to-teeth meshing with the planet gears 28. The first and second sets of teeth 333, 335 exhibit the same configuration and profile relative to one another.

In assembly, as shown in FIG. 8, the torsion spring 372 is located at the skirt portion 386 at the sun gear's interior 378. The first terminal end 374 extends through the first cutout 388 and is inserted into the second cutout 392. The second terminal end 376 is similarly inserted into a cutout (not clearly shown) of the main body 380. Due to these insertions, the torsion spring 372 exerts a biasing force between the first and second teeth segments 382, 384 that serves to impart a rotational pre-load to the second teeth segment 384. Because the planet gears 28 are in teeth-to-teeth meshing engagement with the first and second teeth segments 382, 384, the rotational pre-load causes the planet gears 28 to be urged and displaced in the radially outboard direction 164, as in previous embodiments. The clearances 56 are again compelled to open to their widest extent at the radially outboard side, and compelled to close at the opposite radially inboard side. As a result, any unwanted backlash condition is minimized and NVH is minimized.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An engine variable camshaft timing (VCT) phaser assembly, comprising:
   a planetary gear set comprising:
   at least two ring gears;
   a plurality of planet gears engaged with the at least two ring gears and carried by a plurality of pins having a circular cross-sectional shape, a clearance residing between at least one of the plurality of planet gears and the plurality of pins;
   a sun gear engaged with the plurality of planet gears and rotatable about a central axis;
   at least one spring applying a force in a radial direction and urging the plurality of planet gears radially outboard and displacing the plurality of planet gears radially outboard via the clearance and into engagement with the at least two ring gears; and
   wherein the plurality of pins is fixed to the planetary gear set to prevent radial movement of the plurality of pins relative to the central axis.

2. The engine variable camshaft timing (VCT) phaser assembly as set forth in claim 1, wherein the urging by the at least one spring biases the clearance closed at a radially inboard side of a planet-gear-to-pin confrontation, and biases the clearance open at a radially outboard side of the planet-gear-to-pin confrontation.

3. The engine variable camshaft timing (VCT) phaser assembly as set forth in claim 1, wherein the at least one spring is held by the plurality of pins.

4. The engine variable camshaft timing (VCT) phaser assembly as set forth in claim 3, wherein the at least one spring makes abutment with an inner wall of the plurality of planet gears.

5. The engine variable camshaft timing (VCT) phaser assembly as set forth in claim 1, wherein the plurality of pins has a hollow section and the at least one spring is situated at least partly within the hollow section.

6. The engine variable camshaft timing (VCT) phaser assembly as set forth in claim 1, wherein the plurality of pins has a window residing in a wall of the plurality of pins, and the at least one spring extends through the window to make abutment with an inner wall of the plurality of planet gears.

7. The engine variable camshaft timing (VCT) phaser assembly as set forth in claim 1, wherein the clearance is defined between an inner wall of the plurality of planet gears and an outer wall of the plurality of pins.

8. The engine variable camshaft timing (VCT) phaser assembly as set forth in claim 1, wherein the at least one spring includes a first ring spring and a second ring spring, the first ring spring and the second ring spring being generally situated radially inboard of the plurality of planet gears, the first ring spring making abutment with a first outer wall of the plurality of planet gears and the second ring spring making abutment with a second outer wall of the plurality of planet gears.

9. The engine variable camshaft timing (VCT) phaser assembly as set forth in claim 1, wherein the sun gear has a first teeth segment and a second teeth segment, the at least one spring imparting a rotational pre-load to the second teeth segment.

10. The engine variable camshaft timing (VCT) phaser assembly as set forth in claim 9, wherein the first teeth segment and second teeth segment are rotatable independent of each other.

11. The engine variable camshaft timing (VCT) phaser assembly as set forth in claim 9, wherein the at least one spring is situated at an interior of the sun gear and the at least one spring interacts with a cutout of the second teeth segment to impart the rotational pre-load to the second teeth segment.

12. The engine variable camshaft timing (VCT) phaser assembly as set forth in claim 1, wherein the at least one spring is an at least one leaf spring.

13. The engine variable camshaft timing (VCT) phaser assembly as set forth in claim 1, wherein the at least one spring makes abutment with an outer wall of the plurality of planet gears.

14. The engine variable camshaft timing (VCT) phaser assembly as set forth in claim 1, wherein the at least one spring includes a first ring spring situated at a first axially outboard side of the plurality of planet gears and making abutment with a first axially outboard outer wall of the plurality of planet gears.

15. The engine variable camshaft timing (VCT) phaser assembly as set forth in claim 14, wherein the at least one spring includes a second ring spring situated at a second axially outboard side of the plurality of planet gears and making abutment with a second axially outboard outer wall of the plurality of planet gears.

16. An engine variable camshaft timing (VCT) phaser assembly, comprising:
a planetary gear set comprising at least two ring gears, a plurality of planet gears engaged with the at least two ring gears, and a sun gear engaged with the plurality of planet gears, the planetary gear set further comprising a plurality of pins and a plurality of springs, the plurality of pins carrying the plurality of planet gears, the plurality of pins having a hollow section, the plurality of springs situated at least partly within the hollow section and exerting a biasing force against an inner wall of the plurality of planet gears.

17. The engine variable camshaft timing (VCT) phaser assembly as set forth in claim 16, wherein the plurality of pins has a window residing in a wall of the plurality of pins, and the plurality of springs extends through the window to exert the biasing force against the inner wall of the plurality of planet gears.

18. The engine variable camshaft timing (VCT) phaser assembly as set forth in claim 16, wherein a clearance resides between the inner wall of the plurality of planet gears and an outer wall of the plurality of pins, the biasing force displacing the plurality of planet gears relative to the plurality of pins via the clearance and urging the plurality of planet gears radially outboard.

19. The engine variable camshaft timing (VCT) phaser assembly as set forth in claim 16, wherein the plurality of springs is a plurality of leaf springs.

20. An engine variable camshaft timing (VCT) phaser assembly, comprising:
a planetary gear set comprising:
at least two ring gears; a plurality of planet gears engaged with the at least two ring gears and carried by a plurality of pins having a circular cross-sectional shape, a clearance residing between the plurality of planet gears and the plurality of pins;
a sun gear engaged with the plurality of planet gears and rotatable about a central axis;
a plurality of springs held by the plurality of pins, the plurality of springs applying a force in a radial direction and biasing the clearance closed at a radially inboard side of a planet-gear-to-pin confrontation and biasing the clearance open at a radially outboard side of the planet-gear-to-pin confrontation; and
wherein the plurality of pins is fixed to the planetary gear set to prevent radial movement of the plurality of pins relative to the central axis.

* * * * *